United States Patent
Ran et al.

(10) Patent No.: US 11,505,496 B2
(45) Date of Patent: Nov. 22, 2022

(54) PHOSPHONATO BLOCK POLYMER, PREPARATION METHOD THEREFOR AND APPLICATION THEREOF

(71) Applicants: SOBUTE NEW MATERIALS CO., LTD., Jiangsu (CN); BOTE NEW MATERIALS TAIZHOU CO., LTD., Jiangsu (CN)

(72) Inventors: Qianping Ran, Jiangsu (CN); Tao Wang, Jiangsu (CN); Jiaping Liu, Jiangsu (CN); Shuai Qi, Jiangsu (CN); Jianfeng Ma, Jiangsu (CN); Shimin Fan, Jiangsu (CN); Bing Wang, Jiangsu (CN); Zheng Han, Jiangsu (CN)

(73) Assignees: SOBUTE NEW MATERIALS CO., LTD., Jiangsu (CN); BOTE NEW MATERIALS TAIZHOU CO., LTD., Jiangsu (CN)

(*) Notice: Subject to any disclaimer, the term of this patent is extended or adjusted under 35 U.S.C. 154(b) by 823 days.

(21) Appl. No.: 16/462,300

(22) PCT Filed: Feb. 22, 2017

(86) PCT No.: PCT/CN2017/074355
§ 371 (c)(1),
(2) Date: May 20, 2019

(87) PCT Pub. No.: WO2018/120385
PCT Pub. Date: Jul. 5, 2018

(65) Prior Publication Data
US 2019/0315656 A1    Oct. 17, 2019

(30) Foreign Application Priority Data
Dec. 30, 2016 (CN) .......................... 201611270709.9

(51) Int. Cl.
*C04B 24/24* (2006.01)
*C08G 16/06* (2006.01)
*C04B 103/40* (2006.01)

(52) U.S. Cl.
CPC ............ *C04B 24/243* (2013.01); *C08G 16/06* (2013.01); *C04B 2103/408* (2013.01)

(58) Field of Classification Search
CPC .. C04B 24/243; C04B 2103/408; C08G 16/06
See application file for complete search history.

(56) References Cited

U.S. PATENT DOCUMENTS

2007/0129511 A1* 6/2007 Freitag ................. C08G 63/692
528/398

FOREIGN PATENT DOCUMENTS

| CA | 2427897 C | 8/2012 |
|----|-----------|--------|
| CN | 105399943 A | 3/2016 |
| CN | 105601905 A | 5/2016 |
| WO | 2010040612 A1 | 4/2010 |
| WO | 2016030482 A1 | 3/2016 |

OTHER PUBLICATIONS

International Search Report dated Sep. 28, 2017.

* cited by examiner

*Primary Examiner* — John E Uselding
(74) *Attorney, Agent, or Firm* — Miles & Stockbridge P.C.; Ajay Jagtiani

(57) ABSTRACT

Embodiments of the invention relate to concrete admixtures, provide a phosphonato block polymer, a preparation method and an application. The method includes: the phosphonato block polymer prepared by copolycondensating an ether-type segment A, a phosphonato segment B, and a third part of aldehyde C. The ether-type segment A is obtained by polycondensating a polyether monomer and a first part of aldehyde C. The phosphonato segment B is obtained by polycondensating a monomer b containing phosphonato, a monomer c, and a second part of aldehyde C in an aprotic weak polar solvent E. By preparing a block polymer using arylalkane as a main chain and using a phosphonic acid or phosphinic acid functional group as an adsorption group, the invention improves the resistance of the block polymer to sulfate and clay interference, and can achieve initial high dispersion of concrete with a low water-cement ratio and decreasing of the system viscosity.

20 Claims, No Drawings

PHOSPHONATO BLOCK POLYMER, PREPARATION METHOD THEREFOR AND APPLICATION THEREOF

The present application claims priority to Chinese Patent Application No. 201611270709.9, entitled "Phosphonato block polymer, preparation method therefor and application thereof", which is filed on Dec. 30, 2016. The content is incorporated herein by reference.

BACKGROUND OF THE INVENTION

Technical Field

The invention belonging to the technical field of concrete admixtures, relates to a phosphonato block polymer, and a preparation method and applications thereof.

Description of Related Art

As a new building material, the high-strength concrete is widely used in high-rise building structures, large-span bridge structures and certain special structures because of its superior compressive strength, strong deformation resistance, high density and low porosity. The most important feature of the high-strength concrete is its high compressive strength, generally 4~6 times that of the ordinary mixed concrete, so that the cross-section of components can be reduced, making it most suitable for high-rise buildings. Therefore, the prestressed high-strength concrete structures are increasingly used throughout the world and are used in large-span houses and bridges. In addition, the high-strength concrete featuring high density can be used to build structures which can withstand impacts and blast loads, such as atomic reactor foundations. By virtue of the characteristics of strong impermeability and corrosion resistance of the high-strength concrete, industrial pools with high impermeability and high corrosion resistance can be constructed.

The preparation of the high-strength concrete requires special requirements for cements, mineral admixtures, fine aggregates, coarse aggregates, admixtures and water, among which an admixture technology is the core technology. In order to ensure the flowability of the high-strength concrete for the convenience in pumping construction and vibrating compaction, and meanwhile the possibility of reducing the amount of cementitious materials under the premise of ensuring strength, a high-strength water reducer with water reduction rate not less than 25% should be adopted for the preparation of the high-strength concrete. When preparing the concrete with C80 and above strength grade, the water-reducing rate of the high-performance water reducer should not be less than 28%. Other properties of the admixture should conform to the corresponding national or industry standards.

As a new type of high performance water reducer, the polycarboxylic acid admixture is also called superplasticizer. Due to its wide source of raw materials for copolymers, the molecular composition can be designed, with low content, good slump loss resistant performance and low shrinkage of the concrete. The outstanding advantages, such as strong tunability of molecular structure and clean production process, have become hot spots in the research and development of concrete admixtures both at home and abroad.

However, in the process of practical application, the special nature of many projects at home and abroad and the obvious changes in the seasons, the uneven quality of sand and stone materials in different regions, and the large difference in mud and powder contents, will result in difficulty of initial dispersion for the concrete (≤0.36) with a low water-binder ratio, large viscosity, easy bleeding, poor flowability, and even failure to meet the required strength at later stages. In response to this phenomenon, the molecular design and process development of polycarboxylic acid have been increased at home and abroad, but the effect is not obvious, which cannot fundamentally solve the problems.

Patent CN105175658A relates to a comb-like polycarboxylic acid water reducer for bonding modified silica fume, comprising the following steps: (1) using TPEG (prenyl polyoxyethylene ether) and AA in a reversible addition-fragmentation transfer polymerization reaction under the action of a chain transfer agent and an initiator, (2) using TPEG and a mixture of AA and KA570 in a reversible addition-fragmentation chain transfer polymerization under the action of a chain transfer agent and an initiator, (3) using TPEG in an action with the surface-hydroxyl-modified silica fume, to prepare a comb-like block polycarboxylate water reducer bonding the modified silica fume. The advantages of the invention are as follows: the prepared polycarboxylic acid water reducer has a narrow molecular weight distribution and can have a structure controllable, and the polymer and the surface-hydroxyl-modified silica fume are easier to bond, which can be used in batches, thus reducing the labor intensity and making the application of concrete wider.

Patent CN103482897B provides a block polycarboxylic acid concrete superplasticizer with an ordered structure and a preparation method thereof. An atom transfer radical polymerization is used to prepare a block polycarboxylic acid, thereby effectively controlling the regularity of polycarboxylic acid structure and its molecular weight distribution is applied to the process of cement dispersion, which solves the problems of uncontrollable molecular weight of polycarboxylic acid, wide molecular weight distribution, and inability to design molecular structures.

Patent CN105713150A provides a method for preparing a sulfate-resisting polycarboxylic acid water reducer and applications thereof. The water reducer, composed of monomer a, monomer b and monomer c, can be used in the reversible addition-fragmentation chain transfer polymerization. In the invention, by incorporating a strong adsorption group-phosphonic acid group on the main chain structure of the block polycarboxylic acid with a well-defined sequence structure, the block polycarboxylic acid has a stronger adsorption capacity, thus improving the resistance to sulphate. Therefore, the polycarboxylic acid water reducer prepared by the invention has the advantages, such as low content, high water reduction rate, small slump loss, good cement adaptability and resistance to sulfate; the synthesis method of the invention is simple with low process requirements, and the production cost is low with less environmental pollution.

Patent CN105175740A discloses a method for preparing an easy-to-reactive ester polycarboxylic acid water reducer, which is first mixed with acrylic acid and a highly-reactive active monomer, added with an oxidizing agent and a co-initiator, and dropwise added with a mixture of a saturated monomer, a chain transfer agent, a reducer and water at a low temperature for reaction to obtain an intermediate of the block copolymer, then added with the polyethylene glycol monomethyl ether and a catalyst for esterification grafting, and finally neutralized. The easy-to-reactive ester polycarboxylic acid water reducer prepared by the invention is designed through a molecular structure, introducing an easy-to-reactive active monomer and adopting a method of low-temperature polymerization followed by high-temperature esterification. The method features a low ratio of double bond destruction, a high degree of copolymerization, an easy-to-reactive performance of the water reducer produced and a high water-reducing ratio; the industrial production process is simple, with the production cycle greatly shortened, and the production process is green and pollution-free.

With the country's large-scale construction of infrastructure, the natural river sands, high-quality fly ash and other resources are increasingly depleted, and artificial aggregates and low-activity industrial waste slag, such as coal gangue and desulfurization ash, are gradually used in modern concrete. The conventional structural design and optimization for the molecular framework of the polycarboxylic acid cannot fundamentally solve a series of application problems, such as low initial dispersion for the concrete with a low water-binder ratio, large slump loss and high systematic viscosity, so that the adjustment of concrete flowability gradually falls into a bottleneck and even limits the development of concrete technologies.

Therefore, it is necessary to develop a next-generation highly-dispersed viscosity-reducing phosphonato polymers which break through the limitations of the molecular structure and mechanism of action of the conventional water reducers, focusing on the innovation of molecular skeletons of novel adsorption groups and rigid backbones, with a wide idea for developing a new generation of phosphonato polymers with increased initial dispersion and reduced systematic viscosity, thus providing a technical support for the engineering applications of the high-strength concrete.

In the process of implementing the present invention, the inventors have found that at least the following problems exist in the prior art: the existing phosphonato polymer used as a cement dispersant has insufficient interference resistance against sulfate and clay, and it is difficult to solve the initial low-water-to-plastic ratio concrete. High dispersion and reduced system viscosity.

BRIEF SUMMARY OF THE INVENTION

Objective of the Invention

In order to improve the resistance of the phosphonato block polymer to sulfate and clay, to achieve initial high dispersion of the low water-to-binder ratio concrete and to reduce the viscosity of the system, the present invention provides a method for preparing a phosphonato block polymer.

The present invention also provides a phosphonato block polymer obtained by the preparation method.

Embodiments of the present invention also provide the use of the phosphonato block polymer as a cement dispersant.

The technical solution is as follows:

In a first aspect of the invention, a method for preparing a phosphonato block polymer is provided, wherein the phosphonato block polymer is prepared by ether-type fragment A, phosphonato fragment B, and third-portion aldehyde C through a copolycondensation reaction, wherein, ether-type fragment A is obtained by the polycondensation of polyether monomer a and first-portion aldehyde C.

The structural formula of polyether monomer a is shown as a-1, a-2, a-3, a-4 or a-5:

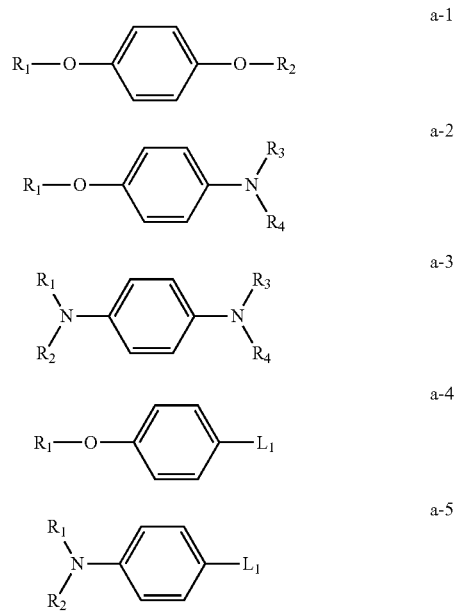

wherein $L_1$ is H, C1~C10 alkyl or $NR_5R_6$, $R_5$ and $R_6$ are both C1~C3 alkyl, and R1, R2, R3 and R4 are of polyoxyalkylene structures which are independent of each other: the polyoxyalkylene structure is composed of a polyoxyethylene structure and an optional polyoxypropylene structure, and the content of the polyoxyethylene structure is not lower than 60 mol %;

the molecular weight of polyether monomer a is 1200~4800, preferably, 1500~2500;

the phosphonato fragment B is obtained by the polycondensation of monomer b, monomer c and second-portion aldehyde C in an aprotic weakly-polar solvent E;

the structural formula of monomer b is shown as b-1 or b-2 or b-3:

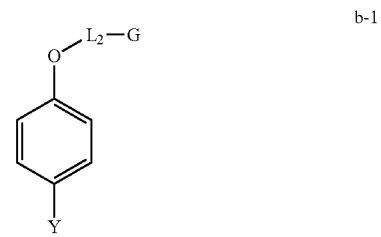

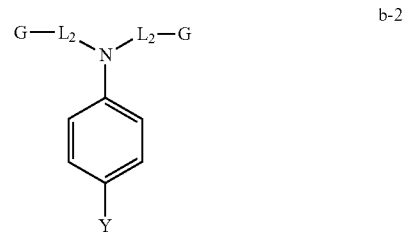

-continued

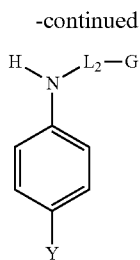

b-3 wherein $L_2$ is C2~C10 linear alkylene or (AO)m, m=1~5, AO is $CH_2CH_2O$ and/or $CH(CH_3)CH_2O$, Y is H, OH, —COOH, —COOR$_7$ or C1~C8 alkyl, wherein R$_7$ is C1~C6 linear alkyl structure; wherein when $L_2$ is C2~C10 linear alkylene, G is —N(CH$_2$—PO$_3$H$_2$)$_2$ and —NH—CH$_2$PO$_3$H$_2$, when $L_2$ is (AO)m, G is —PO$_3$H$_2$;

monomer c is at least one of phenol, aniline, p-/o-aminobenzene sulphonic acid, p-/o-hydroxybenzoic acid, p-/o-aminobenzoic acid, p-/o-hydroxybenzene sulphonic acid, p-o-methylaniline or p-/o-methyl;

monomer c is added in an amount of 1%~10% of the molar amount of monomer b;

aldehyde C is a C1~C6 alkyl aldehyde, C7~C12 aromatic aldehyde or glyoxylic acid;

ether-type fragment A has a molecular weight of 2400~96000 and a degree of polymerization of 2~20;

phosphonato fragment B has a molecular weight of 300~43200 and a degree of polymerization of 2~100;

the phosphonato block polymer has a molecular weight of 6000~100000.

Preferably, R$_1$, R$_2$, R$_3$ and R$_4$ in polyether monomer a are of a hydroxyl-terminated polyoxyalkylene structure, more preferably, R$_1$=R$_2$=R$_3$=R$_4$, most preferably, R$_1$, R$_2$, R$_3$ and R$_4$ are of a hydroxyl-terminated polyoxyethylene structure.

Preferably, R$_5$=R$_6$=C1~C2 alkyl (e.g., methyl).

Preferably, m=1 or 2.

Preferably, Y=H, OH, —COOH or —COOR$_7$ and R$_7$ is a C1~C3 linear alkyl (e.g., methyl, ethyl).

Preferably, $L_2$ is a C2~C4 linear alkylene (e.g., ethylene), and G is —N(CH$_2$—PO$_3$H$_2$)$_2$ and —NH—CH$_2$PO$_3$H$_2$.

Preferably, ether-type fragment A has a molecular weight of 8000~60000 and a degree of polymerization of 5~15;

phosphonato fragment B has a molecular weight of 5000~30000, a degree of polymerization of 15~60, more preferably, a molecular weight of 5000~25000, a degree of polymerization of 15~55;

the phosphonato block polymer has a molecular weight of 14000~100000.

Preferably, a solution containing ether-type fragment A is obtained by the polycondensation of polyether monomer a and first-portion aldehyde C in the presence of first-portion acidic catalyst D, using the first-portion water as a solvent;

a solution containing phosphonato fragment B is obtained by the polycondensation of monomer b, monomer c and second-portion aldehyde C in the presence of second-portion acidic catalyst D, in an aprotic weakly polar solvent E;

the phosphonato block polymer is obtained by mixing the solution containing ether-type fragment A and the solution containing phosphonato fragment B with third-portion acidic catalyst D and second-portion water, following the copolycondensation with third-portion aldehyde C.

More preferably, the solution containing ether-type fragment A is obtained by the polycondensation of polyether monomer a and first-portion aldehyde C in the presence of first-portion acidic catalyst D, using the first-portion water as a solvent;

the molar ratio of polyether monomer a and first-portion aldehyde C is 1:(1.2~3.6), first-portion acid catalyst D is added in an amount of 5%~10% of the molar amount of monomer a, the first-portion water is added in an amount of 1%~20% of the mass of monomer a;

preferably, the solution containing ether-type fragment A is obtained by the polycondensation reaction for 1~6 h at 90~130° C., under a reflux state or a closed pressure condition;

the solution containing phosphonato fragment B is obtained by the polycondensation of monomer b, monomer c and second-portion aldehyde C in the presence of second-portion acid catalyst D, in aprotic weakly-polar solvent E;

the molar ratio of (monomer b+monomer c) to second-portion aldehyde C is 1:(1.0~2.4), second-portion catalyst D is added in an amount of 1%~5% of the molar amount of monomer b, aprotic solvent E is added in an amount of 20%~100% of the mass of monomer b;

aprotic solvent E is at least one of ethylene glycol dimethyl ether, ethylene glycol methyl ethyl ether, diethylene glycol dimethyl ether, diethylene glycol methyl ethyl ether, triethylene glycol dimethyl ether or triethylene glycol methyl ethyl ether, preferably, diethylene glycol methylethyl ether and/or diethylene glycol dimethyl ether.

Preferably, the solution containing phosphonato fragment B is obtained by the polycondensation reaction for 1~4 h at 90~130° C., under a reflux state or a closed pressure condition;

the phosphonato block polymer is obtained by mixing the solution containing ether-type fragment A and the solution containing phosphonato fragment B with third-portion acidic catalyst D and second-portion water, following the copolycondensation with third-portion aldehyde C.

The molar ratio of ether-type fragment A, phosphonato fragment B and third-portion aldehyde C is 1:(0.8~5.0):(0.8~2.0), third-portion acid catalyst D is added in an amount of 20%~50% of the sum of the molar amount of polyether monomer a and phosphonato monomer b, third-portion aldehyde C is added in an amount of 30%~50% of the sum of the molar amount of polyether monomer a and phosphonato monomer b, The second-portion water is added in an amount of 1%~25% of the sum of the masses of the solution containing ether-type fragment A and phosphonato fragment B.

The sum of the molar amount of polyether monomer a and phosphonato monomer b refers to the sum of the molar amount of polyether monomer a added in the polycondensation for obtaining the solution containing ether-type fragment A and the molar amount of phosphonato monomer b added in the polycondensation for obtaining the solution containing phosphonato fragment B;

preferably, the phosphonato block polymer is obtained by the polycondensation reaction for 1~8 h at 90~130° C., under a reflux state or a closed pressure condition;

polyether monomer a can be obtained by an alkoxylation reaction of a simple commercial raw material and alkane or a mixture of ethylene oxide and propylene oxide under the catalytic action of alkali (NaH/NaOMe/NaOH/KOH, etc.) or metal complexes (DMC, Mg/Al complex, etc.); the method is well-known in the art. When the alkoxylation reaction occurs with a mixture of ethylene oxide and propylene oxide, the order of feeding and the feeding mode of the two alkylene oxide monomers can be adjusted as required, so that the structure of the resulting polymer is adjusted to be random copolymerization or block copolymerization, and the order of the two repeating units is adjusted. The invention is not limited to this.

Monomer b can be prepared by a simple phosphonation or phosphonation reaction using a simple commercial raw material. When G is —N(CH$_2$—PO$_3$H$_2$)$_2$ and —NH—CH$_2$PO$_3$H$_2$, monomer b can be obtained by the Mannich reaction of organic chemistry, using the corresponding organic primary amine as a base. The specific method can be referred to the related document (J. Org. Chem. 1966; 31: 1603-1607; Synthesis. 2012; 44: 1628-1630; J. Am. Chem. Soc. 1952; 74: 1528-1531). When X is 0, the common phosphonating reagents or combinations of reagents, such as polyphosphoric acid, P$_2$O$_5$, phosphoric acid, are used, wherein the commonly-used reagent is P$_2$O$_5$. The specific method can be referred to the related document (Liaoning Chemical Industry, 37(8), 505-506; Hebei Chemical Industry, 2004, 1, 1-5, etc.) The relevant preparation technologies are well known in the art.

aldehyde C may be a C1~C6 alkyl aldehyde, such as formaldehyde, acetaldehyde and propionaldehyde (if the chain is too long, the activity will become weaker), or the aromatic aldehydes of C7~C12, such as benzaldehyde, phenylacetaldehyde and phenylpropanal (if the chain is too long, the activity will become weaker), and it may also be glyoxylic acid.

Acidic catalyst D is conventionally selected in the art, mainly selected from concentrated sulfuric acid, methanesulfonic acid, p-toluenesulfonic acid, 2-naphthalenesulfonic acid, phosphonato, oxalic acid, concentrated hydrochloric acid, preferably, concentrated sulfuric acid.

Aprotic weakly-polar solvent E can be selected from the conventional aprotic weakly-polar solvents. As the molecular weight of monomer b increases, its water solubility gradually decreases, and the non-protonic weakly-polar solvent E is a benign solvent of monomer b, which can ensure the clarification and transparency of the reaction system and the continuity of the polycondensation reaction, so that the molecular weight can be accurately controlled. Therefore, the choice of a benign solvent is the key to the preparation technology of phosphonato fragment B, for example, a benign solvent can be selected from at least one of ethylene glycol dimethyl ether, dimethyl ether, diethylene glycol dimethyl ether, diethylene glycol methyl ethyl ether, triethylene glycol dimethyl ether and triethylene glycol methyl ethyl ether, wherein diethylene glycol methyl ethyl ether or diethylene glycol dimethyl ether is more commonly used.

After the synthesis of ether-type fragment A and phosphonato fragment B, the mixture obtained by the reaction is directly used as the raw material for the next step of the polycondensation reaction to react with third-portion aldehyde C, and the acidic catalyst in the resulting mixture and the unreacted aldehyde C both participate in the copolycondensation reaction. It shall be noted that the above third-portion aldehyde C refers to the newly added aldehyde in the copolycondensation reaction, not including the unreacted aldehyde C in the synthesis of ether-type fragment A and phosphonato fragment B. The conversion of polyether monomer a and monomer b is very high, both above 90%. For the sake of simplification, the invention assumes both the conversions of polyether monomer a and monomer b are 100%, that is, all polyether monomers a are converted to ether-type fragment A, and all monomers b are converted to phosphine acid fragment B, in the calculation of the masses of ether-type fragment A in the ether-type fragment A solution and phosphonato fragment B in the phosphonato fragment B solution. With the molecular weight, the molar amount of ether-type fragment A or phosphonato fragment B contained in the polycondensation product can be calculated.

The polycondensation reaction (including the copolycondensation reaction) is performed by a normal operation. Generally, all the reaction materials other than aldehyde C are mixed and dissolved, and aldehyde C is slowly dropwise added. After the dropwise addition is completed, the temperature is increased and the polycondensation reaction is performed.

It shall be noted that in the invention, most of polyether monomers a and b participate in the polycondensation reaction, and the unreacted monomers and by-products do not need to be separated and can be directly used without significantly affecting the dispersion effect thereof.

In order to obtain a better storage stability, it is usually necessary to adjust the pH of the final product to 3.0~10.0 with a concentration of 20%~50%.

According to a second aspect of the invention, the invention also provides a phosphonato block polymer obtained by the above preparation method.

The phosphonato block polymer according to the invention has three key molecular structural features: ① the molecular structure is a block polymer and the polyether structure is concentrated, so that the steric hindrance is enhanced; ② the adsorption group is a phosphonic acid or phosphorous acid structure, so that the single adsorption capacity, compared with the conventional carboxylate or sulfonate, has a qualitative improvement, and the adsorption groups are concentrated so as to achieve an extremely-high adsorption capacity of the polymer; ③ the main chain is of an aromatic alkane structure, which enhances the conformational rigidity of the polymer solution and increases the adsorption efficiency.

According to a third aspect of the invention, the invention also provides the application of the phosphonato block polymer obtained by the above production method as a cement dispersant.

The method for applying the phosphonato block polymer according to the invention is as follows: the amount thereof is 0.05%~0.5% by weight of the total cementitious material, preferably, 0.1%~0.4%, as an improvement. If the amount is too low, the initial dispersion effect of the cement material with a low water-binder ratio is less satisfactory, and if the amount is too high, the retardation time will be delayed, thus affecting the strength and causing the economic waste.

The phosphonato block polymer in the invention has a good compatibility with the conventional additives, and can be used in a mixture with the known aminosulphonic water reducer, lignin water reducer, naphthalene reducer and ester-type carboxylic acid water reducer. Moreover, in addition to the above-mentioned known concrete water reducer, gas-entraining agent, expansion agent, retarder, early strength agent and thickener, shrinkage reducer and defoamer may also be added.

The beneficial effects of the technical solutions provided by the embodiments of the present invention are:

(1) First of all, the block copolymers with the main chain as aromatic backbone and the adsorption group as phosphonic acid or phosphonite functional group are designed and prepared, and the key technology is polycondensation;

(2) the raw materials are easy to be purchased, the process is simple and feasible, and the equipment investment is not large, having a prospect of industrialization;

(3) the phosphonato block polymer prepared by the technology of the invention can significantly improve the initial dispersion capacity of the concrete with a low water-binder ratio, reduce the systematic viscosity, and have a good adaptability for the sand-bone structure of the cement, clay and sulphate content, thus improving the pumpability of the concrete with a low water-binder ratio, and has a promising application prospect for high-strength concrete.

DETAILED DESCRIPTION OF THE INVENTION

In order to make the objects, technical solutions and advantages of the present invention more clear, the embodiments of the present invention will be further described in detail below.

The above are only the preferred embodiments of the present invention, and are not intended to limit the present invention. Any modifications, equivalents, improvements, etc., which are within the spirit and scope of the present invention, should be included in the protection of the present invention. Within the scope.

In the embodiments of the invention, the used reagents, except monomer b, are commercially available analytical pure reagents, and monomer b is self-manufactured according to the following synthesis method described in the following documents: (1) J. Org. Chem. 1966; 31: 1603-1607; Synthesis. 2012; 44: 1628-1630; J. Am. Chem. Soc. 1952; 74: 1528-1531; (2) Liaoning Chemical Industry, 37(8), 505-506; (3) Hebei Chemical Industry, 2004, 1, 1~5.

Molecular weight test conditions: the molecular weights of all the polycondensates in the embodiments of the invention are determined using aqueous gel chromatography (GPC). The experimental conditions are as follows:
gel column: Shodex SB806+803, two columns in series;
mobile phase: 0.1M $NaNO_3$ aqueous solution;
mobile phase speed: 1.01 ml/min;
injection: 20 μl 0.5% aqueous solution;
detector: Shodex RI-71 differential refractive index detector;
standards: polyethylene glycol GPC standards (Sigma-Aldrich, molecular weight 1010000, 478000, 263000, 118000, 44700, 18600, 6690, 1960, 628, 232).

Since the conversion of monomer a, monomer b and monomer c is close to 100%, it is assumed that monomer a, monomer b and monomer c all participate in the polycondensation reaction and enter the polymer chain of the responding polycondensate at 100%; meanwhile, it is assumed that the molar ratio of the structure corresponding to monomer a in ether-type fragment A to the structure corresponding to aldehyde C are 1:1, and the molar ratio of (the structure corresponding to monomer b+the structure corresponding to monomer c) in phosphonato fragment B to the structure corresponding to aldehyde C is 1:1. On the premise of the above assumption, the degree of polymerization of the polycondensate is deduced based on the molecular weight test result, wherein the degree of polymerization of phosphonato fragment B is calculated by the simplified process as follows:

the molar ratio of monomer b to monomer c is set to be equal to x, and the molecular weight $M_0$ of phosphonato fragment B corresponding to x+1 polymerization degree is calculated; the actually measured molecular weight of phosphonato fragment B is M, so the degree of polymerization of phosphonato fragment B is $(x+1) \cdot M/M_0$. The above calculation process is based on the following premise: from an average point of view, it is assumed that monomer b and monomer c enter the polymer chain at an initial monomer molar ratio, so an average degree of polymerization is calculated; the degree of polymerization of phosphonato fragment B=the degree of polymerization of the repeating unit corresponding to monomer b+the degree of polymerization of the repeating unit corresponding to monomer c. The repeating unit corresponding to monomer b is a structure corresponding to monomer b and a structure corresponding to the aldehyde connected thereto, and the repeating unit corresponding to monomer c is sequentially analogized.

The molar amount of ether-type fragment A is calculated as follows:

It is assumed that the molar amount of monomer a added during the preparation of ether-type fragment A is y, the degree of polymerization of ether-type fragment A is z, and the mass of the solution containing ether-type fragment A obtained when the ether-type fragment A is prepared is $m_1$, so the molar amount of ether-type fragment A in the solution containing ether-type fragment A per unit mass is $y/(z \cdot m_1)$, and if the mass of the solution containing ether-type fragment A added during the preparation of the block polymer is $m_2$, the molar amount of fragment A contained therein is $m_2 \cdot y/(z \cdot m_1)$;

it is assumed that the molar amount of monomer b added when phosphonato group B is prepared is s, the degree of polymerization of phosphonato group B is t, the degree of polymerization of the repeating unit corresponding to monomer b is $x \cdot t/(x+1)$, and the mass of the solution containing phosphonato group fragment B obtained when phosphonato fragment B is prepared is $m_1'$, so the molar amount of phosphonato fragment B in the solution containing phosphonato fragment B per unit mass is $s \cdot (x+1)/(x \cdot t \cdot m_1')$, and if the mass of the solution containing phosphonato fragment B added during the preparation of the block polymer is $m_2'$, the molar amount of ether-type fragment A contained therein is $m_2' \cdot s \ (x+1)/(x \cdot t \cdot m_1')$.

In the application embodiments of the invention, unless otherwise specified, the cement used is Jiangnan Xiaoyetian Cement (P.O 42.5), and the stone is a gravel with a continuous gradation of 5~20 mm. The sand is shown in Table 2.0. A cement paste fluidity test is conducted according to GB/T8077-2000 standard, wherein cement is 300 g, water is 87 g, and the cement paste fluidity is measured on the plate glass after being stirred for 3 min. The results are shown in Table 1.0. The performance of the concrete incorporated in the polymer in the invention is tested according to JC 473-2001 "Concrete Pumping Agent". The dosing amount is the amount of solid content.

The number and molecular structure of monomer a involved in the embodiments:

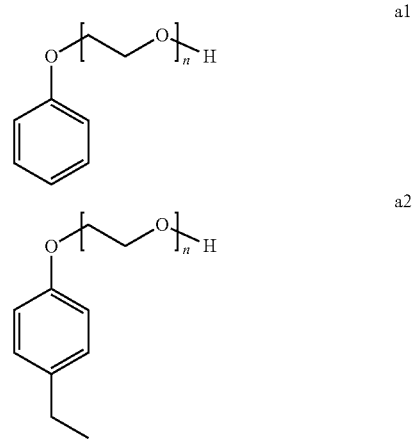

a3
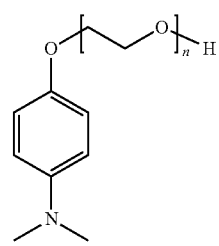
a4
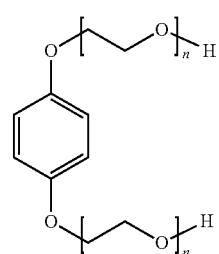
a5
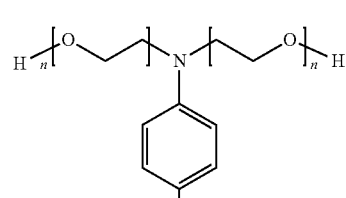
a6
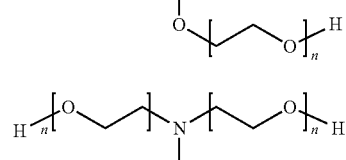
a7
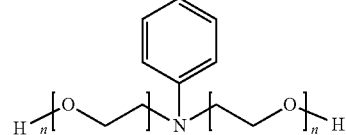
a8
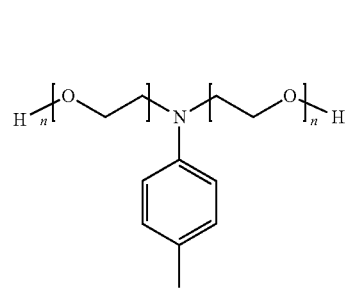
The number and molecular structure of monomer b involved in the embodiments:
b1
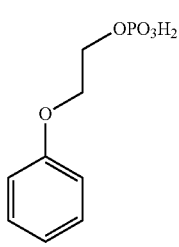
b2
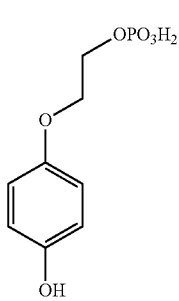
b3
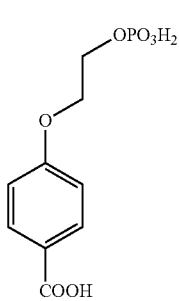
b4
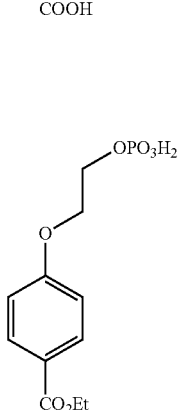
b5
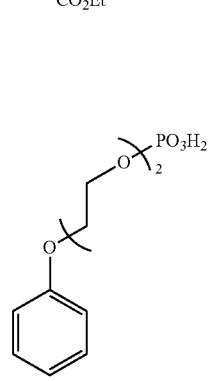

-continued b6
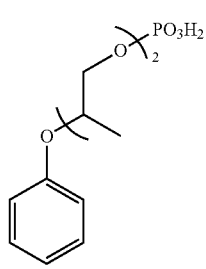

b7
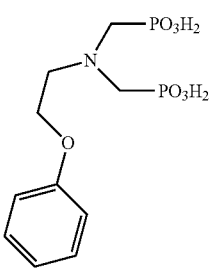

b8
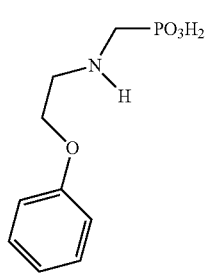

b9
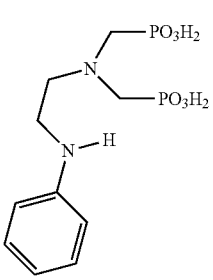

b10
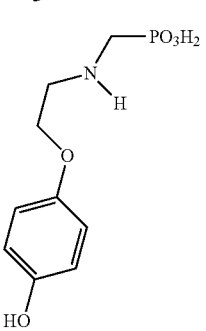

Synthesis Embodiment 1

(1) Synthesis of Ether-Type Fragment A

In a 1000 ml four-necked flask equipped with an electro-mechanical stirrer, polyether monomer a1 (Mw=1200) (0.10 mol), the reacting solvent water (10.0 g) and concentrated sulfuric acid (catalyst) (0.005 mol) were successively added, and stirred for 10 min until the mixture was uniform; formaldehyde (0.13 mol) was slowly dropwise added for about 30 min, and then the temperature was raised to 100° C. for a reaction of 2 h and cooled down, and a colorless or light yellow solution, that is, the solution containing ether-type fragment A, was obtained. LC (liquid chromatography) test: the conversion of monomer a was 95%; GPC test: weight-average molecular weight Mw≈8200, the degree of polymerization was approximately 5.

(2) Synthesis of Phosphonato Fragment B

In a 1000 ml four-necked flask equipped with an electro-mechanical stirrer and a constant-temperature heating oil bath, polyether monomer b1 (0.02 mol), monomer c-phenol (0.01 mol), reacting solvent E-ethylene glycol dimethyl ether (20.0 g) (ratio per unit mass: 36%) and concentrated sulfuric acid (catalyst) (0.01 mol) were successively added, and stirred for 10 min until the mixture was uniform; formaldehyde (0.22 mol) was slowly dropwise added for about 30 min, and then the temperature was raised to 103° C. for a reaction of 1.5 h and cooled down, and a colorless or light yellow solution, that is, the solution containing phosphonato fragment B, was obtained. LC test: the conversion of monomer b was 94%; GPC test: weight-average molecular weight Mw≈5800, the degree of polymerization was approximately 24.

(3) Preparation of Phosphonato Block Polymer

In a 1000 ml four-neck flask equipped with an electro-mechanical stirrer, the above-prepared solution (about 145 g) containing ether-type fragment A and the solution (about 81 g) containing phosphonato fragment B (wherein the molar ratio of phosphonato fragment B/ether-type fragment A is 4.8), concentrated sulfuric acid (catalyst) (0.06 mol) (20% of the molar amount of (polyether monomer a+phosphonato monomer b)) and a suitable amount of reacting solvent water (10 g) were sequentially added, and stirred for 10 min until the mixture was uniform; formaldehyde (0.10 mol) (33% of the molar amount of (polyether monomer a+phosphonato monomer b)) was slowly dropwise added for about 30 min, and then the temperature was raised to 108° C. for a reaction of 2.5 h and cooled down, with PH adjusted to about 4.0 after liquid caustic soda was added and the solid content adjusted to about 30% after water was added, and a colorless or light yellow solution was obtained. GPC test: weight-average molecular weight Mw≈15000.

Synthesis Embodiment 2

(1) Synthesis of Ether-Type Fragment A

In a 1000 ml four-necked flask equipped with an electro-mechanical stirrer, polyether monomer a2 (Mw=2000) (0.10 mol), the reacting solvent water (25.0 g) and concentrated sulfuric acid (catalyst) (0.006 mol) were successively added, and stirred for 10 min until the mixture was uniform; formaldehyde (0.16 mol) was slowly dropwise added for about 30 min, and then the temperature was raised to 106° C. for a reaction of 3.0 h and cooled down, and a colorless or light yellow solution, that is, the solution containing ether-type fragment A, was obtained. LC (liquid chromatography) test: the conversion of monomer a was 93%; GPC test: weight-average molecular weight Mw≈16000, the degree of polymerization was approximately 7.

(2) Synthesis of Phosphonato Fragment B

In a 1000 ml four-necked flask equipped with an electro-mechanical stirrer and a constant-temperature heating oil bath, polyether monomer b2 (0.25 mol), monomer c-phenol (0.02 mol), reacting solvent E-ethylene glycol dimethyl ether (18.0 g) (ratio per unit mass: 26%) and concentrated sulfuric acid (catalyst) (0.02 mol) were successively added, and stirred for 10 min until the mixture was uniform; formaldehyde (0.28 mol) was slowly dropwise added for about 30 min, and then the temperature was raised to 103° C. for a reaction of 2.2 h and cooled down, and a colorless or light yellow solution, that is, the solution containing phosphonato fragment B, was obtained. LC test: the conversion of monomer b was 95%; GPC test: weight-average molecular weight Mw≈7100, the degree of polymerization was approximately 28.

(3) Preparation of Phosphonato Block Polymer

In a 1000 ml four-neck flask equipped with an electro-mechanical stirrer, the above-prepared solution (about 242 g) containing ether-type fragment A and the solution (about 103 g) containing phosphonato fragment B (wherein the molar ratio of phosphonato fragment B/ether-type fragment A is 4), concentrated sulfuric acid (catalyst) (0.08 mol) (23% of the molar amount of (polyether monomer a+phosphonato monomer b)) and a suitable amount of reacting solvent water (25 g) were sequentially added, and stirred for 10 min until the mixture was uniform; formaldehyde (0.12 mol) (34% of the molar amount of (polyether monomer a+phosphonato monomer b)) was slowly dropwise added for about 30 min, and then the temperature was raised to 110° C. for a reaction of 3.5 h and cooled down, with PH adjusted to about 4.0 after liquid caustic soda was added and the solid content adjusted to about 30% after water was added, and a colorless or light yellow solution was obtained. GPC test: weight-average molecular weight Mw≈23800.

Synthesis Embodiment 3

(1) Synthesis of Ether-Type Fragment A

In a 1000 ml four-necked flask equipped with an electro-mechanical stirrer, polyether monomer a3 (Mw=2500) (0.10 mol), the reacting solvent water (28.0 g) and concentrated sulfuric acid (catalyst) (0.007 mol) were successively added, and stirred for 10 min until the mixture was uniform; formaldehyde (0.22 mol) was slowly dropwise added for about 30 min, and then the temperature was raised to 108° C. for a reaction of 3.5 h and cooled down, and a colorless or light yellow solution, that is, the solution containing ether-type fragment A, was obtained. LC (liquid chromatography) test: the conversion of monomer a was 92%; GPC test: weight-average molecular weight Mw≈17500, the degree of polymerization was approximately 6.

(2) Synthesis of Phosphonato Fragment B

In a 1000 ml four-necked flask equipped with an electro-mechanical stirrer and a constant-temperature heating oil bath, polyether monomer b3 (0.26 mol), monomer c-phenol (0.01 mol), reacting solvent E-ethylene glycol dimethyl ether (17.5 g) (ratio per unit mass: 23%) and concentrated sulfuric acid (catalyst) (0.03 mol) were successively added, and stirred for 10 min until the mixture was uniform; formaldehyde (0.32 mol) was slowly dropwise added for about 30 min, and then the temperature was raised to 103° C. for a reaction of 3.2 h and cooled down, and a colorless or light yellow solution, that is, the solution containing phosphonato fragment B, was obtained. LC test: the conversion of monomer b was 94%; GPC test: weight-average molecular weight Mw≈8300, the degree of polymerization was approximately 30.

(3) Preparation of Phosphonato Block Polymer

In a 1000 ml four-neck flask equipped with an electro-mechanical stirrer and a constant-temperature heating oil bath, the above-prepared solution (about 306 g) containing ether-type fragment A and the solution (about 105 g) containing phosphonato fragment B (wherein the molar ratio of phosphonato fragment B/ether-type fragment A is 5), concentrated sulfuric acid (catalyst) (0.10 mol) (28% of the molar amount of (polyether monomer a+phosphonato monomer b)) and a suitable amount of reacting solvent water (35 g) were sequentially added, and stirred for 10 min until the mixture was uniform; formaldehyde (0.14 mol) (39% of the molar amount of (polyether monomer a+phosphonato monomer b)) was slowly dropwise added for about 30 min, and then the temperature was raised to 115° C. for a reaction of 4.2 h and cooled down, with PH adjusted to about 4.0 after liquid caustic soda was added and the solid content adjusted to about 30% after water was added, and a colorless or light yellow solution was obtained. GPC test: weight-average molecular weight Mw≈26000.

Synthesis Embodiment 4

(1) Synthesis of Ether-Type Fragment A

In a 1000 ml four-necked flask equipped with an electro-mechanical stirrer, polyether monomer a4 (Mw=4000) (0.10 mol), the reacting solvent water (35.0 g) and concentrated sulfuric acid (catalyst) (0.008 mol) were successively added, and stirred for 10 min until the mixture was uniform; formaldehyde (0.24 mol) was slowly dropwise added for about 30 min, and then the temperature was raised to 106° C. for a reaction of 4.5 h and cooled down, and a colorless or light yellow solution, that is, the solution containing ether-type fragment A, was obtained. LC (liquid chromatography) test: the conversion of monomer a was 91%; GPC test: weight-average molecular weight Mw≈36000, the degree of polymerization was approximately 8.

(2) Synthesis of Phosphonato Fragment B

In a 1000 ml four-necked flask equipped with an electro-mechanical stirrer and a constant-temperature heating oil bath, polyether monomer b4 (0.24 mol), monomer c-phenol (0.008 mol), reacting solvent E-ethylene glycol dimethyl ether (23.2 g) (ratio per unit mass: 32%) and concentrated sulfuric acid (catalyst) (0.04 mol) were successively added, and stirred for 10 min until the mixture was uniform; formaldehyde (0.34 mol) was slowly dropwise added for about 30 min, and then the temperature was raised to 102° C. for a reaction of 4 h (over 1-4 h) and cooled down, and a colorless or light yellow solution, that is, the solution containing phosphonato fragment B, was obtained. LC test: the conversion of monomer b was 93%; GPC test: weight-average molecular weight Mw≈9600, the degree of polymerization was approximately 34.

(3) Preparation of Phosphonato Block Polymer

In a 1000 ml four-neck flask equipped with an electro-mechanical stirrer and a constant-temperature heating oil bath, the above-prepared solution (about 460 g) containing ether-type fragment A and the solution (about 100 g) containing phosphonato fragment B (wherein the molar ratio of phosphonato fragment B/ether-type fragment A is 4.3), concentrated sulfuric acid (catalyst) (0.12 mol) (35% of the molar amount of (polyether monomer a+phosphonato monomer b)) and a suitable amount of reacting solvent water (43 g) were sequentially added, and stirred for 10 min until the mixture was uniform; formaldehyde (0.16 mol) (47% of the molar amount of (polyether monomer a+phosphonato monomer b)) was slowly dropwise added for about 30 min, and then the temperature was raised to 120° C. for a reaction of 4.8 h and cooled down, with PH adjusted to about 4.0 after liquid caustic soda was added and the solid content adjusted to about 30% after water was added, and a colorless or light yellow solution was obtained. GPC test: weight-average molecular weight Mw≈48000.

Synthesis Embodiment 5

(1) Synthesis of Ether-Type Fragment A

In a 1000 ml four-necked flask equipped with an electromechanical stirrer, polyether monomer a5 (Mw=4800) (0.10 mol), the reacting solvent water (34.0 g) and concentrated sulfuric acid (catalyst) (0.010 mol) were successively added, and stirred for 10 min until the mixture was uniform; formaldehyde (0.23 mol) was slowly dropwise added for about 30 min, and then the temperature was raised to 104° C. for a reaction of 5.5 h and cooled down, and a colorless or light yellow solution, that is, the solution containing ether-type fragment A, was obtained. LC (liquid chromatography) test: the conversion of monomer a was 92%; GPC test: weight-average molecular weight Mw≈45000, the degree of polymerization was approximately 9.

(2) Synthesis of Phosphonato Fragment B

In a 1000 ml four-necked flask equipped with an electromechanical stirrer and a constant-temperature heating oil bath, polyether monomer b5 (0.28 mol), monomer c-phenol (0.006 mol), reacting solvent E-ethylene glycol dimethyl ether (24.5 g) (ratio per unit mass: 29%) and concentrated sulfuric acid (catalyst) (0.05 mol) were successively added, and stirred for 10 min until the mixture was uniform; formaldehyde (0.32 mol) was slowly dropwise added for about 30 min, and then the temperature was raised to 103° C. for a reaction of 3.8 h (over 1-4 h) and cooled down, and a colorless or light yellow solution, that is, the solution containing phosphonato fragment B, was obtained. LC test: the conversion of monomer b was 94%; GPC test: weight-average molecular weight Mw≈14000, the degree of polymerization was approximately 38.

(3) Preparation of Phosphonato Block Polymer

In a 1000 ml four-neck flask equipped with an electromechanical stirrer and a constant-temperature heating oil bath, the above-prepared solution (about 544 g) containing ether-type fragment A and the solution (about 125 g) containing phosphonato fragment B (wherein the molar ratio of phosphonato fragment B/ether-type fragment A is 4.2), concentrated sulfuric acid (catalyst) (0.14 mol) (50% of the molar amount of (polyether monomer a+phosphonato monomer b)) and a suitable amount of reacting solvent water (54 g) were sequentially added, and stirred for 10 min until the mixture was uniform; formaldehyde (0.14 mol) (37% of the molar amount of (polyether monomer a+phosphonato monomer b)) was slowly dropwise added for about 30 min, and then the temperature was raised to 128° C. for a reaction of 4.8 h and cooled down, with PH adjusted to about 4.0 after liquid caustic soda was added and the solid content adjusted to about 30% after water was added, and a colorless or light yellow solution was obtained. GPC test: weight-average molecular weight Mw≈65000.

Synthesis Embodiment 6

(1) Synthesis of Ether-Type Fragment A

In a 1000 ml four-necked flask equipped with an electromechanical stirrer, polyether monomer a6 (Mw=4600) (0.10 mol), the reacting solvent water (36.0 g) and concentrated sulfuric acid (catalyst) (0.010 mol) were successively added, and stirred for 10 min until the mixture was uniform; formaldehyde (0.30 mol) was slowly dropwise added for about 30 min, and then the temperature was raised to 110° C. for a reaction of 5.8 h and cooled down, and a colorless or light yellow solution, that is, the solution containing ether-type fragment A, was obtained. LC (liquid chromatography) test: the conversion of monomer a was 93%; GPC test: weight-average molecular weight Mw≈58000, the degree of polymerization was approximately 12.

(2) Synthesis of Phosphonato Fragment B

In a 1000 ml four-necked flask equipped with an electromechanical stirrer and a constant-temperature heating oil bath, polyether monomer b6 (0.32 mol), monomer c-phenol (0.01 mol), reacting solvent E-ethylene glycol dimethyl ether (28.5 g) (ratio per unit mass: 29%) and concentrated sulfuric acid (catalyst) (0.05 mol) were successively added, and stirred for 10 min until the mixture was uniform; formaldehyde (0.35 mol) was slowly dropwise added for about 30 min, and then the temperature was raised to 105° C. for a reaction of 4.0 h and cooled down, and a colorless or light yellow solution, that is, the solution containing phosphonato fragment B, was obtained. LC test: the conversion of monomer b was 94%; GPC test: weight-average molecular weight Mw≈24000, the degree of polymerization was approximately 58.

(3) Preparation of Phosphonato Block Polymer

In a 1000 ml four-neck flask equipped with an electromechanical stirrer and a constant-temperature heating oil bath, the above-prepared solution (about 530 g) containing ether-type fragment A and the solution (about 148 g) containing phosphonato fragment B (wherein the molar ratio of phosphonato fragment B/ether-type fragment A is 4.8), concentrated sulfuric acid (catalyst) (0.16 mol) (38% of the molar amount of (polyether monomer a+phosphonato monomer b)) and a suitable amount of reacting solvent water (56 g) were sequentially added, and stirred for 10 min until the mixture was uniform; formaldehyde (0.16 mol) (38% of the molar amount of (polyether monomer a+phosphonato monomer b)) was slowly dropwise added for about 30 min, and then the temperature was raised to 125° C. for a reaction of 4.8 h and cooled down, with PH adjusted to about 4.0 after liquid caustic soda was added and the solid content adjusted to about 30% after water was added, and a colorless or light yellow solution was obtained. GPC test: weight-average molecular weight Mw≈96000.

Synthesis Embodiment 7

(1) Synthesis of Ether-Type Fragment A

In a 1000 ml four-necked flask equipped with an electromechanical stirrer, polyether monomer a7 (Mw=2800) (0.10 mol), the reacting solvent water (52.0 g) and concentrated sulfuric acid (catalyst) (0.008 mol) were successively added, and stirred for 10 min until the mixture was uniform; formaldehyde (0.26 mol) was slowly dropwise added for about 30 min, and then the temperature was raised to 108° C. for a reaction of 4.2 h and cooled down, and a colorless or light yellow solution, that is, the solution containing ether-type fragment A, was obtained. LC (liquid chromatography) test: the conversion of monomer a was 93%; GPC test: weight-average molecular weight Mw≈32000, the degree of polymerization was approximately 10.

(2) Synthesis of Phosphonato Fragment B

In a 1000 ml four-necked flask equipped with an electromechanical stirrer and a constant-temperature heating oil bath, polyether monomer b7 (0.25 mol), monomer c-phenol (0.008 mol), reacting solvent E-ethylene glycol dimethyl ether (48.6 g) (ratio per unit mass: 63%) and concentrated sulfuric acid (catalyst) (0.04 mol) were successively added, and stirred for 10 min until the mixture was uniform; formaldehyde (0.30 mol) was slowly dropwise added for about 30 min, and then the temperature was raised to 104° C. for a reaction of 4.0 h and cooled down, and a colorless or light yellow solution, that is, the solution containing phosphonato fragment B, was obtained. LC test: the conversion of monomer b was 93%; GPC test: weight-average molecular weight Mw≈9000, the degree of polymerization was approximately 24.

(3) Preparation of Phosphonato Block Polymer

In a 1000 ml four-neck flask equipped with an electro-mechanical stirrer and a constant-temperature heating oil bath, the above-prepared solution (about 360 g) containing ether-type fragment A and the solution (about 148 g) containing phosphonato fragment B (wherein the molar ratio of phosphonato fragment B/ether-type fragment A is 2.4), concentrated sulfuric acid (catalyst) (0.16 mol) (46% of the molar amount of (polyether monomer a+phosphonato monomer b)) and a suitable amount of reacting solvent water (76 g) were sequentially added, and stirred for 10 min until the mixture was uniform; formaldehyde (0.16 mol) (46% of the molar amount of (polyether monomer a+phosphonato monomer b)) was slowly dropwise added for about 30 min, and then the temperature was raised to 124° C. for a reaction of 4.8 h and cooled down, with PH adjusted to about 4.0 after liquid caustic soda was added and the solid content adjusted to about 30% after water was added, and a colorless or light yellow solution was obtained. GPC test: weight-average molecular weight Mw≈46000.

Synthesis Embodiment 8

(1) Synthesis of Ether-Type Fragment A

In a 1000 ml four-necked flask equipped with an electro-mechanical stirrer, polyether monomer a8 (Mw=2000) (0.10 mol), the reacting solvent water (40.0 g) and concentrated sulfuric acid (catalyst) (0.007 mol) were successively added, and stirred for 10 min until the mixture was uniform; formaldehyde (0.36 mol) was slowly dropwise added for about 30 min, and then the temperature was raised to 106° C. for a reaction of 3.6 h and cooled down, and a colorless or light yellow solution, that is, the solution containing ether-type fragment A, was obtained. LC (liquid chromatography) test: the conversion of monomer a was 94%; GPC test: weight-average molecular weight Mw≈28000, the degree of polymerization was approximately 12.

(2) Synthesis of Phosphonato Fragment B

In a 1000 ml four-necked flask equipped with an electro-mechanical stirrer and a constant-temperature heating oil bath, polyether monomer b8 (0.29 mol), monomer c-phenol (0.006 mol), reacting solvent E-ethylene glycol dimethyl ether (26.8 g) (ratio per unit mass: 29%) and concentrated sulfuric acid (catalyst) (0.03 mol) were successively added, and stirred for 10 min until the mixture was uniform; formaldehyde (0.30 mol) was slowly dropwise added for about 30 min, and then the temperature was raised to 106° C. for a reaction of 3.6 h and cooled down, and a colorless or light yellow solution, that is, the solution containing phosphonato fragment B, was obtained. LC test: the conversion of monomer b was 92%; GPC test: weight-average molecular weight Mw≈7200, the degree of polymerization was approximately 18.

(3) Preparation of Phosphonato Block Polymer

In a 1000 ml four-neck flask equipped with an electro-mechanical stirrer and a constant-temperature heating oil bath, the above-prepared solution (about 275 g) containing ether-type fragment A and the solution (about 146 g) containing phosphonato fragment B (wherein the molar ratio of phosphonato fragment B/ether-type fragment A is 1.5), concentrated sulfuric acid (catalyst) (0.15 mol) (38% of the molar amount of (polyether monomer a+phosphonato monomer b)) and a suitable amount of reacting solvent water (78 g) were sequentially added, and stirred for 10 min until the mixture was uniform; formaldehyde (0.18 mol) (46% of the molar amount of (polyether monomer a+phosphonato monomer b)) was slowly dropwise added for about 30 min, and then the temperature was raised to 128° C. for a reaction of 4.0 h and cooled down, with PH adjusted to about 4.0 after liquid caustic soda was added and the solid content adjusted to about 30% after water was added, and a colorless or light yellow solution was obtained. GPC test: weight-average molecular weight Mw≈37500, recorded as Sample 8.

Synthesis Embodiment 9

(1) Synthesis of Ether-Type Fragment A

In a 1000 ml four-necked flask equipped with an electro-mechanical stirrer and a constant-temperature heating oil bath (normal temperature), polyether macro-monomer a2 (Mw=1500) (0.10 mol), the reacting solvent water (28.0 g) and concentrated sulfuric acid (catalyst) (0.006 mol) were successively added, and stirred for 10 min until the mixture was uniform; formaldehyde (0.26 mol) was slowly dropwise added for about 30 min, and then the temperature was raised to 110° C. for a reaction of 2.8 h and cooled down, and a colorless or light yellow solution, that is, the solution containing ether-type fragment A, was obtained. LC (liquid chromatography) test: the conversion of monomer a was 96%; GPC test: weight-average molecular weight Mw≈16000, the degree of polymerization was approximately 9.

(2) Synthesis of Phosphonato Fragment B

In a 1000 ml four-necked flask equipped with an electro-mechanical stirrer and a constant-temperature heating oil bath, polyether monomer b9 (0.26 mol), monomer c-phenol (0.008 mol), reacting solvent E-ethylene glycol dimethyl ether (24.6 g) (ratio per unit mass: 28%) and concentrated sulfuric acid (catalyst) (0.03 mol) were successively added, and stirred for 10 min until the mixture was uniform; formaldehyde (0.28 mol) was slowly dropwise added for about 30 min, and then the temperature was raised to 106° C. for a reaction of 3.6 h and cooled down, and a colorless or light yellow solution, that is, the solution containing phosphonato fragment B, was obtained. LC test: the conversion of monomer b was 93%; GPC test: weight-average molecular weight Mw≈6400, the degree of polymerization was approximately 16.

(3) Preparation of Phosphonato Block Polymer

In a 1000 ml four-neck flask equipped with an electro-mechanical stirrer and a constant-temperature heating oil bath, the above-prepared solution (about 204 g) containing ether-type fragment A and the solution (about 136 g) containing phosphonato fragment B (wherein the molar ratio of phosphonato fragment B/ether-type fragment A is 1.8), concentrated sulfuric acid (catalyst) (0.12 mol) (33% of the molar amount of (polyether monomer a+phosphonato monomer b)) and a suitable amount of reacting solvent water (68 g) were sequentially added, and stirred for 10 min until the mixture was uniform; formaldehyde (0.17 mol) (47% of the molar amount of (polyether monomer a+phosphonato monomer b)) was slowly dropwise added for about 30 min, and then the temperature was raised to 120° C. for a reaction of 3.6 h and cooled down, with PH adjusted to about 4.0 after liquid caustic soda was added and the solid content adjusted to about 30% after water was added, and a colorless or light yellow solution was obtained. GPC test: weight-average molecular weight Mw≈23500, recorded as Sample 9.

Synthetic Embodiment 10

(1) Synthesis of Ether-Type Fragment A

In a 1000 ml four-necked flask equipped with an electro-mechanical stirrer, polyether monomer a3 (Mw=1300) (0.10 mol), the reacting solvent water (25.0 g) and concentrated sulfuric acid (catalyst) (0.006 mol) were successively added, and stirred for 10 min until the mixture was uniform; formaldehyde (0.27 mol) was slowly dropwise added for about 30 min, and then the temperature was raised to 106° C. for a reaction of 2.0 h and cooled down, and a colorless or light yellow solution, that is, the solution containing ether-type fragment A, was obtained. LC (liquid chromatography) test: the conversion of monomer a was 94%; GPC test: weight-average molecular weight Mw≈12000, the degree of polymerization was approximately 8.

(2) Synthesis of Phosphonato Fragment B

In a 1000 ml four-necked flask equipped with an electro-mechanical stirrer and a constant-temperature heating oil bath, polyether monomer b10 (0.24 mol), monomer c-phenol (0.006 mol), reacting solvent E-ethylene glycol dimethyl ether (18.6 g) (ratio per unit mass: 23%) and concentrated sulfuric acid (catalyst) (0.02 mol) were successively added, and stirred for 10 min until the mixture was uniform; formaldehyde (0.28 mol) was slowly dropwise added for about 30 min, and then the temperature was raised to 109° C. for a reaction of 3.5 h and cooled down, and a colorless or light yellow solution, that is, the solution containing phosphonato fragment B, was obtained. LC test: the conversion of monomer b was 93%; GPC test: weight-average molecular weight Mw≈6200, the degree of polymerization was approximately 6.

(3) Preparation of Phosphonato Block Polymer

In a 1000 ml four-neck flask equipped with an electro-mechanical stirrer and a constant-temperature heating oil bath, the above-prepared solution (about 186 g) containing ether-type fragment A and the solution (about 146 g) containing phosphonato fragment B (wherein the molar ratio of phosphonato fragment B/ether-type fragment A is 0.8), concentrated sulfuric acid (catalyst) (0.10 mol) (29% of the molar amount of (polyether monomer a+phosphonato monomer b)) and a suitable amount of reacting solvent water (50 g) were sequentially added, and stirred for 10 min until the mixture was uniform; formaldehyde (0.15 mol) (44% of the molar amount of (polyether monomer a+phosphonato monomer b)) was slowly dropwise added for about 30 min, and then the temperature was raised to 116° C. for a reaction of 3.2 h and cooled down, with PH adjusted to about 4.0 after liquid caustic soda was added and the solid content adjusted to about 30% after water was added, and a colorless or light yellow solution was obtained. GPC test: weight-average molecular weight Mw≈19400, recorded as Sample 10.

Comparative Embodiment 1 (Conventional Ether-Type Polycarboxylic Acid)

Prenol polyoxyethylene ether (Mw=1500) (300 g (0.2 mol)) and water (61 g) were mixed into a 1000 ml three-necked flask, and the temperature was raised to 65° C. while methacrylic acid solution (42.5 g) (70% concentration, 0.5 mol), ammonium persulfate solution (30.6 g) (30% concentration) and thioglycolic acid (10.3 g) were slowly dropwise added for 2 h; after the dropwise addition, the reaction was continued for 3 h to obtain ether-type polycarboxylic acid mother liquid A which is a colorless transparent solution. The test shows that the conversion of monomer a was 86%, and the weight average molecular weight of ether-type polycarboxylic acid A was 32000, recorded as Control 1.

Comparative Embodiment 2 (Conventional Ester-Type Polycarboxylic Acid)

Ester-type polyether macro-monomer (Mw=1200) (240 g (0.2 mol)) and water (60 g) were mixed into a 1000 ml three-necked flask, and the temperature was raised to 65° C. while acrylic acid solution (41.8 g) (70% concentration, 0.5 mol), ammonium persulfate solution (30.0 g) (30% concentration) and thioglycolic acid (9.8 g) were slowly dropwise added for 2 h; after the dropwise addition, the reaction was continued for 3 h to obtain ester-type polycarboxylic acid mother liquid A which is a colorless transparent solution. The test shows that the conversion of monomer a was 89%, and the weight average molecular weight of ester-type polycarboxylic acid A was 31000, recorded as Control 2.

Application Embodiment 1

In order to evaluate the dispersibility of the phosphonato block polycondensate prepared in the invention to the cement paste, a cement paste fluidity test was performed according to the GB/T8077-2000 standard. The experimental results are shown in Table 1.

In the application embodiments of the invention, unless otherwise specified, the cement used is Xiaoyetian 52.5 RPII cement (Jiangnan Xiaoyetian Cement Co., Ltd.), the sand is medium sand with a fineness modulus Mx of 2.6, and the stone is a gravel with a continuous gradation of 5~20 mm. The cement paste fluidity test was conducted according to the GB/T8077-2000 standard. The amount of water added was 87 g, and the cement paste fluidity was measured on a plate glass after being stirred for 3 min. The slump and slump loss are referenced to JC473-2001 "Concrete Pumping Agents".

TABLE 1

Cement paste fluidity of samples

| Sample No. | Amount of solid content/wt % | Paste fluidity/mm | |
|---|---|---|---|
| | | 0 min | 60 min |
| Sample 1 | 0.12 | 256 | 202 |
| Sample 2 | 0.12 | 260 | 204 |
| Sample 3 | 0.12 | 262 | 206 |
| Sample 4 | 0.12 | 250 | 200 |
| Sample 5 | 0.12 | 255 | 208 |
| Sample 6 | 0.12 | 248 | 207 |
| Sample 7 | 0.12 | 254 | 204 |
| Sample 8 | 0.12 | 258 | 203 |
| Sample 9 | 0.12 | 260 | 200 |
| Sample 10 | 0.12 | 262 | 198 |
| Control 1 | 0.12 | 242 | 206 |
| Control 2 | 0.12 | 235 | 232 |

The data in Table 1 show that the phosphonato block polymers provided in the present technology have an excellent initial water-reducing capacity; when the amounts are all 0.12%, compared with conventional ether-type or ester-type polycarboxylic acid water reducer (comparing Sample 1 with Control 2), the initial paste fluidity of cement has obvious advantages, but the ordinary slump loss resistant performance at 60 minutes indicates that the polycondensate has an excellent initial dispersibility of cement paste.

Application Embodiment 2

In order to evaluate the adaptability of the phosphonato block polymer in the invention to cement, the initial paste fluidity was tested by using a paste stirrer according to the GB/T 8077-2000 "Testing method for the homogeneity of concrete admixture" for determining the cement paste fluidity, with cement of 300 g, water of 87 g; the control sample was an ether-type or ester-type polycarboxylic superplasticizer (PCA) prepared by conventional techniques. The test results are shown in Table 2.

TABLE 2

Adaptability of samples to different cements

| | | Cement paste fluidity/mm | | | | |
|---|---|---|---|---|---|---|
| | Amount of solid content/wt % | Xiaoyetian cement | Helin cement | Hailuo cement | Jidong cement | Qilianshan cement |
| Sample 1 | 0.12 | 240 | 252 | 242 | 232 | 236 |
| Sample 2 | 0.12 | 251 | 246 | 243 | 241 | 232 |
| Sample 3 | 0.12 | 234 | 242 | 234 | 233 | 220 |
| Sample 4 | 0.12 | 248 | 240 | 242 | 234 | 233 |
| Sample 5 | 0.12 | 235 | 246 | 238 | 238 | 228 |
| Sample 6 | 0.12 | 233 | 244 | 233 | 233 | 224 |
| Sample 7 | 0.12 | 252 | 248 | 245 | 242 | 238 |
| Sample 8 | 0.12 | 257 | 252 | 256 | 252 | 245 |
| Sample 9 | 0.12 | 262 | 260 | 243 | 240 | 241 |
| Sample 10 | 0.12 | 260 | 258 | 252 | 253 | 250 |
| Control 1 | 0.12 | 197 | 192 | 182 | 176 | 152 |
| Control 2 | 0.12 | 162 | 182 | 171 | 162 | 151 |

The data in Table 2 show that the phosphonato block polycondensate provided in the invention has a good cement adaptability and shows a smooth cement paste fluidity in the production of cement in different regions, while the control sample shows a lower initial cement paste fluidity, and the initial cement paste fluidity was found to be greater in different cements, so the adaptability of the cement was poor.

Application Embodiment 3

In order to evaluate the adaptability of the polycondensate in the invention to clay, the initial paste fluidity was tested by using a paste stirrer according to GB/T8077-2000 "Testing method for the homogeneity of concrete admixture" for determining the cement paste fluidity, with cement of 300 g (Helin Cement, Jiangsu Helin Cement Co., Ltd.) and water of 87 g; 0.5% and 1% of montmorillonite of the cementitious material were added respectively, and control sample is the conventional ether-type and ester-type polycarboxylic acid (PCA). The test results are shown in Table 3.

TABLE 3

Test on clay resistance of samples

| | | Cement paste fluidity/mm | | |
|---|---|---|---|---|
| | Amount of solid content/wt % | Initial | Added with 0.5% montmorillonite | Added with 1.0% montmorillonite |
| Sample 1 | 0.12 | 240 | 240 | 236 |
| Sample 2 | 0.12 | 243 | 235 | 232 |

TABLE 3-continued

Test on clay resistance of samples

| | | Cement paste fluidity/mm | | |
|---|---|---|---|---|
| | Amount of solid content/wt % | Initial | Added with 0.5% montmorillonite | Added with 1.0% montmorillonite |
| Sample 3 | 0.12 | 236 | 242 | 244 |
| Sample 4 | 0.12 | 242 | 238 | 242 |
| Sample 5 | 0.12 | 234 | 232 | 240 |
| Sample 6 | 0.12 | 243 | 232 | 236 |
| Sample 7 | 0.12 | 242 | 238 | 233 |

TABLE 3-continued

Test on clay resistance of samples

| | | Cement paste fluidity/mm | | |
|---|---|---|---|---|
| | Amount of solid content/wt % | Initial | Added with 0.5% montmorillonite | Added with 1.0% montmorillonite |
| Sample 8 | 0.12 | 244 | 236 | 230 |
| Sample 9 | 0.12 | 235 | 241 | 242 |
| Sample 10 | 0.12 | 243 | 236 | 240 |
| Control 1 | 0.12 | 204 | 182 | 108 |
| Control 2 | 0.12 | 210 | 190 | 125 |

The data in Table 3 show that the phosphonato block polymer provided in the invention has a montmorillonite resistance. When the montmorillonite (0.5% and 1.0% of the amount of the plastic cement material) were added respectively, the value of the paste fluidity, compared with the case without the montmorillonite, had no obvious decrease, with the scalability basically remaining at the same level; for the control sample of the conventional polycarboxylic acid water reducer (PCA), the paste fluidity had a rapid decrease of even more than 50%, as the amount of montmorillonite increased. In the market environment where the quality of concrete aggregates and admixtures gradually deteriorates, the polycondensate water reducer has a wide space for engineering applications, and its clay resistance will be gradually accepted by the market.

Application Embodiment 4

In order to evaluate the adaptability of the phosphonato block polycondensate in the invention to sulfate, the initial paste fluidity was tested by using a paste stirrer according to GB/T8077-2000 "Testing method for the homogeneity of concrete admixture" for determining the cement paste fluidity, with cement of 300 g (Helin Cement, Jiangsu Helin Cement Co., Ltd.) and water of 87 g; 0.5% and 1% of sodium sulfate of the cementitious material were added respectively. The test results are shown in Table 4.

TABLE 4

Test on sulfate resistance of samples

|  | | Cement paste fluidity/mm | |
| --- | --- | --- | --- |
|  | Amount of solid content/wt % | Initial | Added with 0.5% sodium sulfate | Added with 1.0% sodium sulfate |
| Sample 1 | 0.12 | 242 | 240 | 238 |
| Sample 2 | 0.12 | 250 | 248 | 246 |
| Sample 3 | 0.12 | 233 | 230 | 229 |
| Sample 4 | 0.12 | 246 | 241 | 235 |
| Sample 5 | 0.12 | 232 | 228 | 220 |
| Sample 6 | 0.12 | 234 | 230 | 226 |
| Sample 7 | 0.12 | 240 | 237 | 230 |
| Sample 8 | 0.12 | 246 | 240 | 228 |
| Sample 9 | 0.12 | 235 | 236 | 235 |
| Sample 10 | 0.12 | 247 | 230 | 232 |
| Control 1 | 0.12 | 220 | 176 | 135 |
| Control 2 | 0.12 | 236 | 188 | 118 |

The data in Table 4 show that the phosphonato block polymer provided in the invention has an anti-sulfate ion interference capacity, and the adsorption capacity of phosphonate ion is larger than that of carboxylate ion and phosphononic acid block combination, which greatly improves the adsorption efficiency and the amount of adsorption. In the cement paste system, when sodium sulfate (0.5% and 1.0% of the amount of the plastic cement material) were added respectively, the value of the paste fluidity, compared with the case without sodium sulfate, shows no obvious decrease in the scalability; the scalability of the paste has no significant decrease compared with when no sulfate is added. The paste fluidity of the conventional ether-type or ester-type polycarboxylic acid water reducer (PCA) had a certain decrease, as the sulphate increased, indicating that the competitive adsorption of sulfate ion and polycarboxylic acid water reducer occurs on the surface of cement particles. In a cement system with poor-quality concrete admixtures and high sulfate, the sulfate-reducing properties of the polycondensate block water reducer have a potential enormous space for application.

Application Embodiment 5

According to the testing requirements of the GB8076-2008 "Concrete admixture" standard for a high-performance water reducer, Helin Cement (Jiangsu Helin Cement Co., Ltd.), the machine-made mountain sand with mud content of 1.8% and fineness modulus of 3.3, and gravels of continuous gradation with nominal particle size of 5-10 mm and 10-20 mm and mud content of 0.6% were used as materials. The water-reducing ratio, gas content, slump retention of the polycondensate water reducer and other indicators were tested according to the mixing ratio specified in Table 5. The test results are shown in Table 6.

TABLE 5

Mix ratio of high-strength concretes

| Raw material | Water-binder ratio | Cement | Silica powder | Mechine-made mountain sand | 5-10 mm stone | 10-20 mm stone | Water |
| --- | --- | --- | --- | --- | --- | --- | --- |
| Mixing ratio, kg/m3 | 0.24 | 495 | 55 | 740 | 666 | 444 | 130 |

TABLE 6

Test on performance of high-strength concretes under the action of a novel polycondensate water reducer

| Sample name | Amount of solid content (%) | Gas content (%) | Slump (mm) Initial | Slump (mm) After 1 h | Scalability (mm) Initial | Scalability (mm) After 1 h | Time of inverting the slump cone (s) |
| --- | --- | --- | --- | --- | --- | --- | --- |
| Sample 1 | 0.11 | 2.8 | 215 | 192 | 513 | 432 | 25 |
| Sample 2 | 0.11 | 2.6 | 220 | 185 | 516 | 441 | 26 |
| Sample 3 | 0.11 | 2.5 | 213 | 178 | 518 | 431 | 28 |
| Sample 4 | 0.11 | 2.7 | 216 | 190 | 510 | 429 | 30 |
| Sample 5 | 0.12 | 2.2 | 214 | 194 | 512 | 438 | 24 |
| Sample 6 | 0.12 | 2.6 | 221 | 185 | 514 | 445 | 25 |
| Sample 7 | 0.12 | 2.4 | 217 | 176 | 515 | 434 | 26 |
| Sample 8 | 0.12 | 2.2 | 218 | 165 | 520 | 421 | 19 |
| Sample 9 | 0.10 | 2.6 | 219 | 167 | 521 | 425 | 18 |
| Sample 10 | 0.10 | 2.5 | 220 | 175 | 519 | 426 | 17 |
| Control 1 | 0.10 | 2.4 | 182 | / | 450 | / | 52 |
| Control 2 | 0.10 | 2.6 | 193 | / | 462 | / | 49 |

Note:
/ indicates that the concretes have no values of slump and scalability

The data of concrete fluidity in Table 6 show that if the machine-made mountain sand with mud content of 1.8% and the stone with mud content of 0.6% were used as the aggregate, with a low water-binder ratio, under the condition of similar gas contents, the newly-synthesized phosphononic acid block polymer shows a higher slump value and scalability than the conventional ether-type or ester-type polycarboxylic superplasticizer (PCA), and the time of inverting the slump cone was reduced by more than 50%, indicating that the phosphonato block polycondensation water reducer has good adaptability to the sand or stone with high mud contents, thus effectively improving the initial dispersion and reducing the viscosity by more than 50%.

The phosphonato block polymer provided in the invention has a novel structure, and the preparation process can be industrialized. The phosphonate is used instead of the conventional carboxyl as a main adsorbent group of a water reducer, and the structure of the main chain sequence is of a block type which is significantly different from the main chain structure of the conventional ether-type or ester-type polycarboxylic acid, thus fully improving the initial dispersion of a concrete with a low water-binder and effectively reducing the viscosity of a concrete by more than 50%, which is beneficial to the pumping construction of a high-strength concrete in super high-rise, ultra-long-distance and high-temperature environments. In addition, the invention exhibits a good cement adaptability, clay resistance and an anti-sulfate ion competitive absorption capacity. In the current market environment where concrete aggregates and admixtures are of poor quality, the water reducer has strong advantages and a space for market applications.

What is claimed is:

1. A method for preparing a phosphonic block polymer, characterized in that the phosphonic block polymer is prepared by the copolycondensation of ether-type fragment A, phosphonic fragment B and third-portion aldehyde C; the molar ratio of ether-type fragment A to phosphonic fragment B is 1:(0.8~5.0);

wherein, ether-type fragment A is obtained by the polycondensation of polyether monomer a and first-portion aldehyde C, the structural formula of polyether monomer a is shown as a-1, a-2, a-3, a-4 or a-5:

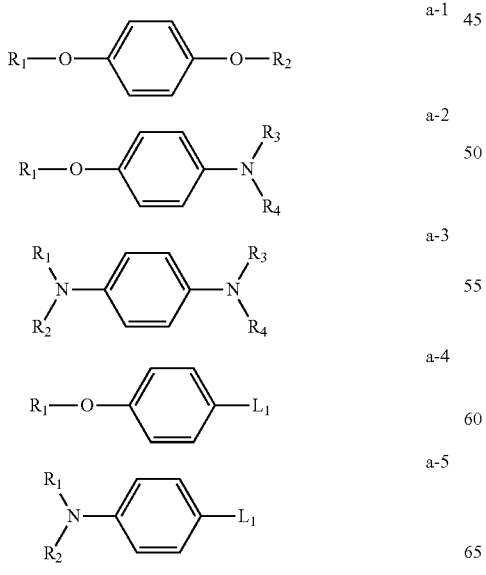

wherein $L_1$ is H, C1~C10 alkyl or $NR_5R_6$, $R_5$ and $R_6$ are both C1~C3 alkyl, and R1, R2, R3 and R4 are of polyoxyalkylene structures which are independent of each other: the polyoxyalkylene structure is composed of a polyoxyethylene structure and an optional polyoxypropylene structure, and the content of the polyoxyethylene structure is not lower than 60 mol %;

the molecular weight of polyether monomer a is 1200~4800;

the phosphonic fragment B is obtained by the polycondensation of monomer b, monomer c and second-portion aldehyde C in an aprotic weakly-polar solvent E;

the structural formula of monomer b is shown as b-1 or b-2 or b-3:

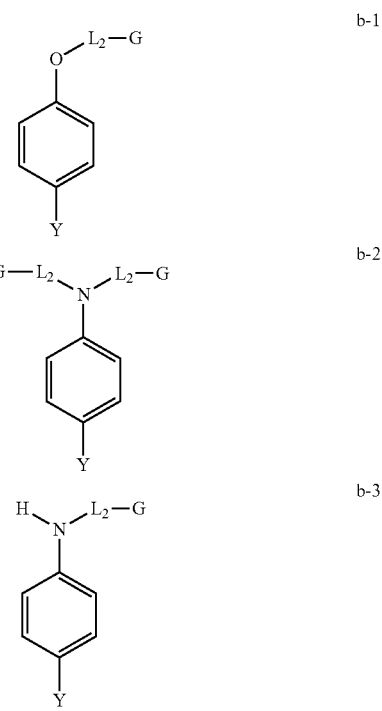

wherein $L_2$ is C2~C10 linear alkylene or $(AO)m$, $m=1~5$, AO is $CH_2CH_2O$ and/or $CH(CH_3)CH_2O$, Y is H, OH, —COOH, —$COOR_7$ or C1~C8 alkyl, wherein $R_7$ is C1~C6 linear alkyl structure; wherein when $L_2$ is C2-C10 linear alkylene, G is —$N(CH_2\text{-}PO_3H_2)_2$ and —NH—$CH_2PO_3H_2$, when $L_2$ is $(AO)m$, G is –$PO_3H_2$;

monomers c is at least one of phenol, aniline, p-/o-aminobenzene sulphonic acid, p-/o-hydroxybenzoic acid, p-/o-aminobenzoic acid, p-/o-hydroxybenzene sulphonic acid, p-o-methylaniline or p-/o-methyl;

monomer c is added in an amount of 1%~10% of the molar amount of monomer b;

aldehyde C is a C1~C6 alkyl aldehyde, C7~C12 aromatic aldehyde or glyoxylic acid;

ether-type fragment A has a molecular weight of 2400~96000 and a degree of polymerization of 2~20;

phosphonic fragment B has a molecular weight of 300~43200 and a degree of polymerization of 2~100;

the phosphonic block polymer has a molecular weight of 6000~100000.

2. The method for preparing a phosphonic block polymer as claimed in claim 1, wherein
a solution containing ether-type fragment A is obtained by the polycondensation of polyether monomer a and first-portion aldehyde C in the presence of first-portion acidic catalyst D, using a first-portion water as a solvent;
a solution containing phosphonic fragment B is obtained by the polycondensation of monomer b, monomer c and second-portion aldehyde C in the presence of second-portion acidic catalyst D, in an aprotic weakly polar solvent E;
the phosphonic block polymer is obtained by mixing the solution containing ether-type fragment A and the solution containing phosphonic fragment B with third-portion acidic catalyst D and second-portion water, following the copolycondensation with third-portion aldehyde C.

3. The method for preparing a phosphonic block polymer as claimed in claim 2, wherein
the solution containing ether-type fragment A is obtained by the polycondensation of polyether monomer a and first-portion aldehyde C in the presence of first-portion acidic catalyst D, using the first-portion water as a solvent;
the molar ratio of polyether monomer a to first-portion aldehyde C is 1:(1.2~3.6);
first-portion acid catalyst D is added in an amount of 5%~10% of the molar amount of monomer a;
the first-portion water is added in an amount of 1%~20% of the mass of monomer a.

4. The method for preparing a phosphonic block polymer as claimed in claim 3, wherein
the solution containing ether-type fragment A is obtained by the polycondensation of polyether monomer a and first-portion aldehyde C in the presence of first-portion acidic catalyst D, using the first-portion water as a solvent, at 90~130° C. for 1~6h, under a reflux state or a closed pressure condition.

5. The method for preparing a phosphonic block polymer as claimed in claim 2, wherein
the solution containing phosphonic fragment B is obtained by the polycondensation of monomer b, monomer c and second-portion aldehyde C in the presence of second-portion acid catalyst D, in aprotic weakly-polar solvent E;
the molar ratio of (monomer b+monomer c) to second-portion aldehyde C is 1:(1.0~2.4),
second-portion catalyst D is added in an amount of 1%-5% of the molar amount of monomer b;
aprotic solvent E is added in an amount of 20%~100% of the mass of monomer b;
aprotic solvent E is at least one of ethylene glycol dimethyl ether, ethylene glycol methyl ethyl ether, diethylene glycol dimethyl ether, diethylene glycol methyl ethyl ether, triethylene glycol dimethyl ether or triethylene glycol methyl ethyl ether.

6. The method for preparing a phosphonic block polymer as claimed in claim 5, wherein
the solution containing phosphonic fragment B is obtained by the polycondensation of monomer b, monomer c and second-portion aldehyde C in the presence of second-portion acidic catalyst D, in an aprotic weakly-polar solvent E for 1~4 h at 90~130° C., under a reflux state or a closed pressure condition.

7. The method for preparing a phosphonic block polymer as claimed in claim 2, wherein
the phosphonic block polymer is obtained by mixing the solution containing ether-type fragment A and the solution containing phosphonic fragment B with third-portion acidic catalyst D and second-portion water, following the copolycondensation with third-portion aldehyde C,
the molar ratio of ether-type fragment A, phosphonic fragment B and third-portion aldehyde C is 1:(0.8~5.0):(0.8~2.0);
third-portion acid catalyst D is added in an amount of 20%~50% of the sum of the molar amount of polyether monomer a and phosphonic monomer b,
third-portion aldehyde C is added in an amount of 30%~50% of the sum of the molar amount of polyether monomer a and phosphonic monomer b,
the second-portion water is added in an amount of 1%~25% of the sum of the masses of fragment A and fragment B,
the sum of the molar amount of polyether monomer a and phosphonic monomer b refers to the sum of the molar amount of polyether monomer a added in the polycondensation for obtaining the solution containing ether-type fragment A and the molar amount of phosphonic monomer b added in the polycondensation for obtaining the solution containing phosphonic fragment B.

8. The method for preparing a phosphonic block polymer as claimed in claim 7, wherein
the phosphonic block polymer is obtained by mixing the solution containing ether-type fragment A and the solution containing phosphonic fragment B with third-portion acidic catalyst D and second-portion water, following the copolycondensation reaction with third-portion aldehyde C at 90~130° C. for 1~8 h, under a reflux state or a closed pressure condition.

9. A phosphonic block polymer obtained by the method as claimed in claim 1.

10. The phosphonic block polymer as claimed in claim 9, wherein the phosphonic block polymer is a cement dispersant.

11. The phosphonic block polymer as claimed in claim 9, wherein
a solution containing ether-type fragment A is obtained by the polycondensation of polyether monomer a and first-portion aldehyde C in the presence of first-portion acidic catalyst D, using a first-portion water as a solvent;
a solution containing phosphonic fragment B is obtained by the polycondensation of monomer b, monomer c and second-portion aldehyde C in the presence of second-portion acidic catalyst D, in an aprotic weakly polar solvent E;
the phosphonic block polymer is obtained by mixing the solution containing ether-type fragment A and the solution containing phosphonic fragment B with third-portion acidic catalyst D and second-portion water, following the copolycondensation with third-portion aldehyde C.

12. The phosphonic block polymer as claimed in claim 11, wherein
the solution containing ether-type fragment A is obtained by the polycondensation of polyether monomer a and first-portion aldehyde C in the presence of first-portion acidic catalyst D, using the first-portion water as a solvent;

the molar ratio of polyether monomer a to first-portion aldehyde C is 1:(1.2~3.6);

first-portion acid catalyst D is added in an amount of 5%~10% of the molar amount of monomer a;

the first-portion water is added in an amount of 1%~20% of the mass of monomer a.

13. The phosphonic block polymer as claimed in claim 12, wherein the solution containing ether-type fragment A is obtained by the polycondensation of polyether monomer a and first-portion aldehyde C in the presence of first-portion acidic catalyst D, using the first-portion water as a solvent, at 90~130° C. for 1~6h, under a reflux state or a closed pressure condition.

14. The phosphonic block polymer as claimed in claim 11, wherein the solution containing phosphonic fragment B is obtained by the polycondensation of monomer b, monomer c and second-portion aldehyde C in the presence of second-portion acid catalyst D, in aprotic weakly-polar solvent E;

the molar ratio of (monomer b+monomer c) to second-portion aldehyde C is 1:(1.0~2.4), second-portion catalyst D is added in an amount of 1%~5% of the molar amount of monomer b;

aprotic solvent E is added in an amount of 20%~100% of the mass of monomer b;

aprotic solvent E is at least one of ethylene glycol dimethyl ether, ethylene glycol methyl ethyl ether, diethylene glycol dimethyl ether, diethylene glycol methyl ethyl ether, triethylene glycol dimethyl ether or triethylene glycol methyl ethyl ether.

15. The phosphonic block polymer as claimed in claim 14, wherein the solution containing phosphonic fragment B is obtained by the polycondensation of monomer b, monomer c and second-portion aldehyde C in the presence of second-portion acidic catalyst D, in an aprotic weakly-polar solvent E for 1~4 h at 90~130° C., under a reflux state or a closed pressure condition.

16. The phosphonic block polymer as claimed in claim 11, wherein the phosphonic block polymer is obtained by mixing the solution containing ether-type fragment A and the solution containing phosphonic fragment B with third-portion acidic catalyst D and second-portion water, following the copolycondensation with third-portion aldehyde C, the molar ratio of ether-type fragment A, phosphonic fragment B and third-portion aldehyde C is 1:(0.8~5.0):(0.8~2.0);

third-portion acid catalyst D is added in an amount of 20%~50% of the sum of the molar amount of polyether monomer a and phosphonic monomer b, third-portion aldehyde C is added in an amount of 30%~50% of the sum of the molar amount of polyether monomer a and phosphonic monomer b, the second-portion water is added in an amount of 1%~25% of the sum of the masses of fragment A and fragment B, the sum of the molar amount of polyether monomer a and phosphonic monomer b refers to the sum of the molar amount of polyether monomer a added in the polycondensation for obtaining the solution containing ether-type fragment A and the molar amount of phosphonic monomer b added in the polycondensation for obtaining the solution containing phosphonic fragment B.

17. The phosphonic block polymer as claimed in claim 16, wherein the phosphonic block polymer is obtained by mixing the solution containing ether-type fragment A and the solution containing phosphonic fragment B with third-portion acidic catalyst D and second-portion water, following the copolycondensation reaction with third-portion aldehyde C at 90~130° C. for 1~8 h, under a reflux state or a closed pressure condition.

18. The method for preparing a phosphonic acid block polymer as claimed in claim 1, wherein the molecular weight of polyether monomer a is 1500~2500.

19. The method for preparing a phosphonic acid block polymer as claimed in claim 5, wherein aprotic solvent E is diethylene glycol methylethyl ether and/or diethylene glycol dimethyl ether.

20. The method for preparing a phosphonic acid block polymer as claimed in claim 14, wherein aprotic solvent E is diethylene glycol methylethyl ether and/or diethylene glycol dimethyl ether.

* * * * *